United States Patent [19]

Neubert

[11] 4,309,470

[45] Jan. 5, 1982

[54] METHODS AND MEANS FOR MINIMIZING FLOOR DUST PROBLEMS

[76] Inventor: Robert Neubert, Rodskovvej 51, 8543 Hornslet, Denmark

[21] Appl. No.: 87,764

[22] Filed: Oct. 24, 1979

[30] Foreign Application Priority Data

Oct. 25, 1978 [GB] United Kingdom ............... 42129/78

[51] Int. Cl.[3] ...................... B32B 33/00; G01D 18/00

[52] U.S. Cl. ...................................... 428/96; 428/95; 428/236; 428/250; 428/290; 428/496; 116/201; 28/166

[58] Field of Search ...................... 428/37, 62, 82, 87, 428/91, 95, 96, 236, 248, 250, 290, 496; 116/201

[56] References Cited

U.S. PATENT DOCUMENTS

| | | | |
|---|---|---|---|
| 2,734,834 | 2/1956 | Rainard et al. | 428/87 |
| 2,734,835 | 2/1956 | Florio et al. | 428/87 |
| 2,759,865 | 8/1956 | Kolb | 428/37 |
| 3,142,885 | 8/1964 | Capel | 428/37 |
| 3,306,808 | 2/1967 | Thompson | 428/96 X |
| 4,029,834 | 6/1977 | Bartlett | 428/82 X |
| 4,153,749 | 5/1979 | Klein | 428/96 X |

*Primary Examiner*—P. Ives

*Attorney, Agent, or Firm*—Craig and Antonelli

[57] ABSTRACT

A method of binding floor dust and other particles in building rooms, corridors etc. by means of floor mats, where initially a number of test mats are placed on the floor, these mats being clean and white and apart from the color being of a material corresponding to utility mats of the dust binding type, i.e. rubber backed mats of a soft moisture absorbing material which is impregnated to be able to bind considerable amounts of dust, whereby after a suitable test period of time the miscoloring of the mats is inspected and it is decided, based on the geographic occurrence of the most dirty sub areas, where operational service or utility mats should be placed on the floor for maximum dust collection in selected sub areas only.

5 Claims, No Drawings

METHODS AND MEANS FOR MINIMIZING FLOOR DUST PROBLEMS

This invention relates to industrial or professional cleaning of building rooms, and more specifically the invention relates to methods of binding floor dust to prevent it from being spread in the room.

A traditional manner of counteracting the formation of floor dust is to place door mats at all relevant entrances to a room or building area. In private houses and office rooms this measure combined with regular vacuum cleaning is reasonably effective. In rooms with heavy traffic in and out, e.g. shops and some public offices, it has been found that ordinary door mats are insufficient because they do not really bind the dust, and for solving this problem it is now customary to use soft, impregnated mats which absorb moisture and bind considerable amounts of dust and which, on the other hand, are regularly subjected to a washing and reimpregnating treatment. In fact a new type of service industry has been created, hiring out the mats to the customers and undertaking to visit the customers regularly for replacing the dirty mats by new or newly washed mats, whereafter the dirty mats are brought home to the industrial washing plant and are washed and reimpregnated.

With the use of these improved door mats the floor dust problem is counteracted to a large degree, but at many locations such as in factory rooms there still remains a considerable floor dust problem even if door mats are laid at all entrances whereever possible. In that connection it could well under circumstances be effective to place a mat in some internal doorway, e.g. passed by many workers, because the dirt is to a large degree moved around with the people, and if they get the dirt removed from their shoes every time they pass a doorway which they will be liable to pass several times a day, there will be deposited and bound a lot of floor dust on such a mat. However, such a measure will be far from solving the floor dust problem.

It is the purpose of this invention to provide for methods and means for further reducing the floor dust problem.

Basically, the invention builds on the idea that a total solution would be to cover the entire floor area by dust absorbing mat material, though this of course is normally unrealistic. A more realistic solution is to cover but selected portions of the floor, at such areas where relatively much dust could be collected, i.e. at places showing a concentrated traffic of feet. Now, while it will be obvious to think of doorways in that connection, experiments have shown that there may well be other or additional sub areas of the floor showing a relatively high degree of traffic, and it could well be more economic or efficient to place a mat at such a place, even if remote from any door, rather than in one or more doorways. Much could be done in this respect by recording the normal traffic and traffic pattern on the floor, but even this would not provide a reliable picture of where to place the mats in the most efficient way, because the deposition of dust on a mat is not only a question of the intensity of the traffic on it; thus, it may be wise to place a mat at a sub area of heavy traffic, but it could be still wiser to place it at a sub area of less heavy traffic, where the traffic changes its direction, since hereby the people are liable to twist their feet on the mat and thus get their shoe soles cleaned better than by ordinary forward walk, and similarly a mat will be more efficient if placed at a location with relatively small, but pronounced "dirty" traffic.

In order to localize the floor sub areas of maximum dust deposit potential the invention provides for an empiric method involving the use of a plurality of mats of a light color or of a color different from the color of the dirt normally collected on the floor area in question, these mats (or one at a time) are laid at places where they can be expected to receive considerable amounts of dust from the normal traffic on the floor, e.g. in a factory hall, and it is then simply observed where on the floor the sub areas of maximum dust deposit occur. On white mats e.g. it is very easy to see where the most dirty sub areas occur when the actual dirt is dark, and based on such a test it is then easy to decide where regular or service floor mats (which are seldom wanted to be white or of different color to the dirt) should be placed for maximum efficiency and economy.

For testing a large floor area in this manner it is not necessary to cover all of it by e.g. white test mats, since a limited number of mats could be used repeatedly, at various places, when they are used during test periods of a predetermined length and washed between consecutive test periods; the dust pattern on the mats may be recorded e.g. photographically, such that at the end of the test a comparison can be made between all respective sub areas of the entire floor and the most strategic "mat places" can be decided or selected, whereafter ordinary service mats can be laid at just these places. These mats, subjected to periodical replacement, will then remain effective as long as the traffic pattern and other relevant circumstances are substantially unchanged, and the result is that the factory may minimize the floor dust problem with a minimum of effective mat area, dependent of the desired total efficiency. Experiments have shown the minimizing of floor dust in factories with expensive machinery have prolonged the stand time or life of bearings transmissions etc.

The said service industry may of course have at disposal several sets of test mats, e.g. of various sizes and colors; the mats should preferably be of the same type as the ordinary mats of use to be laid at said strategic places, because the dust pattern on the test mats can be expected to be representative of the pattern to occur (less visible) on the mats of use, when these are placed in their correct positions subsequent to the test. The sizes of the test mats will be unimportant, because they shall just serve the purpose of indicating, geographically, the places of maximum dust collection or optimal particle absorption in consideration of the replacement frequency. If by a given test a test mat shows such a place adjacent a free corner or side edge thereof it will of course be natural to repeat the test with the mat position correspondingly changed or with further mat material added in order to detect the extension of the respective maximum dirt deposit area. The degree of dust collection of the test mats can be used as an indication of the required size of mat and/or of the required frequency of replacement for the service or utility mat.

Instead of determining the degrees of dust deposited on the various places by visual inspection of the test mats it will be possible to measure the dust intensity by the degree of impurification of an amount of water in which the respective mats are washed or—if the dust has a natural or artifically added radioactivity—by means of a Geiger counter.

It will be appreciated that for general test purposes according to the invention it will normally be preferable to use a mat of white or at least a light color, but at the same time the mat should be adapted so as to readily absorb moisture and dirt. This, of course, is a rather unusual combination of characteristics for a floor mat, because a dirt absorbing mat—like the utility mats here referred to—will normally be wanted to be of a dark color. The special test mats, therefore, in fact constitute a new product, which may be produced just as the said utility mats, viz. mats treated to have pronounced dust binding or collecting or adsorbing properties such as normally impregnated, washable cotton mats having a rubber backing, but made from white yarn. It is noted that the particular manner in which the mats are prepared so as to readily bind or adsorb dust per se, including the specific treating materials, forms no part of the present invention and is known to those of ordinary skill in the art, such as from U.S. Pat. No. 3,306,808.

When the white test mats have been produced and treated almost exactly as the utility mats, except for the color, they may serve the additional purpose of demonstrating in a visually clear manner the effect of the utility mats, not only qualitatively, but even quantitatively. Thus, the white mats are usable generally as floor dust detectors, whether for both localizing and indicating the dust concentration in many sub areas of a large floor, as described hereinbefore, or for indicating at any preselected place the effect of a utility mat. Therefore, should a customer be in doubt as to the necessity of using, at a given place, a mat of the highly effective utility type, the doubt may be settled if one of the said white test mats is laid on the particular place and is inspected after a suitable interval of time.

The white dust binding test may be used even for checking the efficiency of other mats, e.g. the said dust binding utility mats, since one or more test mats may be placed immediately next to a utility mat, whereafter it can be easily observed whether the white mat or mats collect substantial amounts of dust from feet just having passed the utility mat as located in a conventional position.

When the invention is used for mapping out the floor sub areas in which a high concentration of dust or other unwanted particles occurs these plotted areas should of course be paid special attention as far as the subsequent cleaning routine is concerned. In this connection it will normally be preferable and in some cases even necessary to rely on the use of the said dust absorbing utility mats for successively binding the dust in the specific sub areas, because the white mat test is based on local absorption of any dust capable of being deposited in the various sub areas; if in normal operation the dust is not correspondingly absorbed in a successive manner by means of utility mats the situation may occur that some dust as already deposited somewhere will be moved away by the subsequent traffic and get redeposited at some other place, and the test result will not necessarily be representative of a dust distribution of this type. It is characteristic for both the said utility mats and the white mats according to the invention that generally they are able to absorb and bind the dust without showing the so-called stamp pad effect i.e. without to any considerable degree allowing the dirt to be carried away by the subsequent traffic passing the mats provided the mats are changed before they reach a critical degree of dust saturation.

The use of the method according to the invention is advantageous in that it enables the detection of sub areas in which it is possible to thereafter effectively remove or bind relatively large amounts of dust practically irrespectively of variations of the character of the dust, when dust absorbing mats are used. Thus, for example, it will not make any significant difference whether the dust being absorbed from a shoe or a wheel is more or less humid because it is absorbed anyway, while the starting humidity may otherwise be decisive for on which location the dirt is released from the carrier on a non-absorbing floor area. With the use of the invention, therefore, the test result is more universally representative and correct as a basis for the subsequent selective dust binding or removal in normal operation than would be obtained by way of a test based on the use of a non-absorbing floor cover, which may show pronounced varying test results according to varying environmental conditions such as humidity, temperature, drafts, etc.

Finally it should be mentioned that the white dust absorbing test mats will be able to reveal any collection of dust or particles which is not a direct result of the mats being passed by any traffic, e.g. dust deposited due to special air movements or downfall of dust from the ceiling; again, a test based on the use of a non-absorbing material would not neccessarily reveal local collections of this type, because the collections could be liable to disappear rather soon by sporadic air flows or by traffic happening to pass the concerned area.

It will be appreciated that once the utility mats have been placed on the floor in accordance with the test result, the traffic itself will thereafter act as a cleaning means in bringing dust from open floor areas to the strategically placed mats, where the dust is bound so as to enable the traffic to collect new dust for bringing the same to the next mat.

I claim:

1. A method of indicating the location of sub-areas of a floor liable to collect relative maximum amounts of dust or other undesirable particles resulting primarily from traffic passing over the floor, for the purpose of subsequently operationally removing dust from the floor in a selective manner to generally minimize room dust problems comprising the steps of:

(a) determining the color of the dust or particles normally deposited on the floor;

(b) entirely or partially covering the floor with test mats of a mat material which are treated to have pronounced dust binding or collecting or adsorbing properties and has a color contrasting to or perceptibly different from the determined color of the dust or particles;

(c) periodically determining the color of the test mats until at least one test mat, at least locally, is determined to have changed its color;

(d) determining at least the location of the test mats or local portions thereof determined to have changed color as a result of said test mat color determining step; and (e) removing the test mats.

2. A method according to claim 1, wherein the mat material is selected so as to correspond to the material of dust binding utility mats treated to have pronounded dust binding properties placeable in accordance with the test result in selected positions on the floor for operational binding of the dust, except that the color of the test mat material is white or otherwise light.

3. A method according to claim 1 or 2, wherein the mat material of the test mats is washable and the test mats are of standard size or sizes.

4. A dust localizing detector means for use in carrying out the method according to claim 1, wherein the detector means comprises a floor mat of the washable, soft yarn type, treated to have pronounced properties for binding or adsorbing dust, and yarn being of white or otherwise pronounded light color.

5. A method according to claim 1, wherein the degree of color change is determined in addition to its location during said color change determining step.

* * * * *